United States Patent Office 3,096,573
Patented July 9, 1963

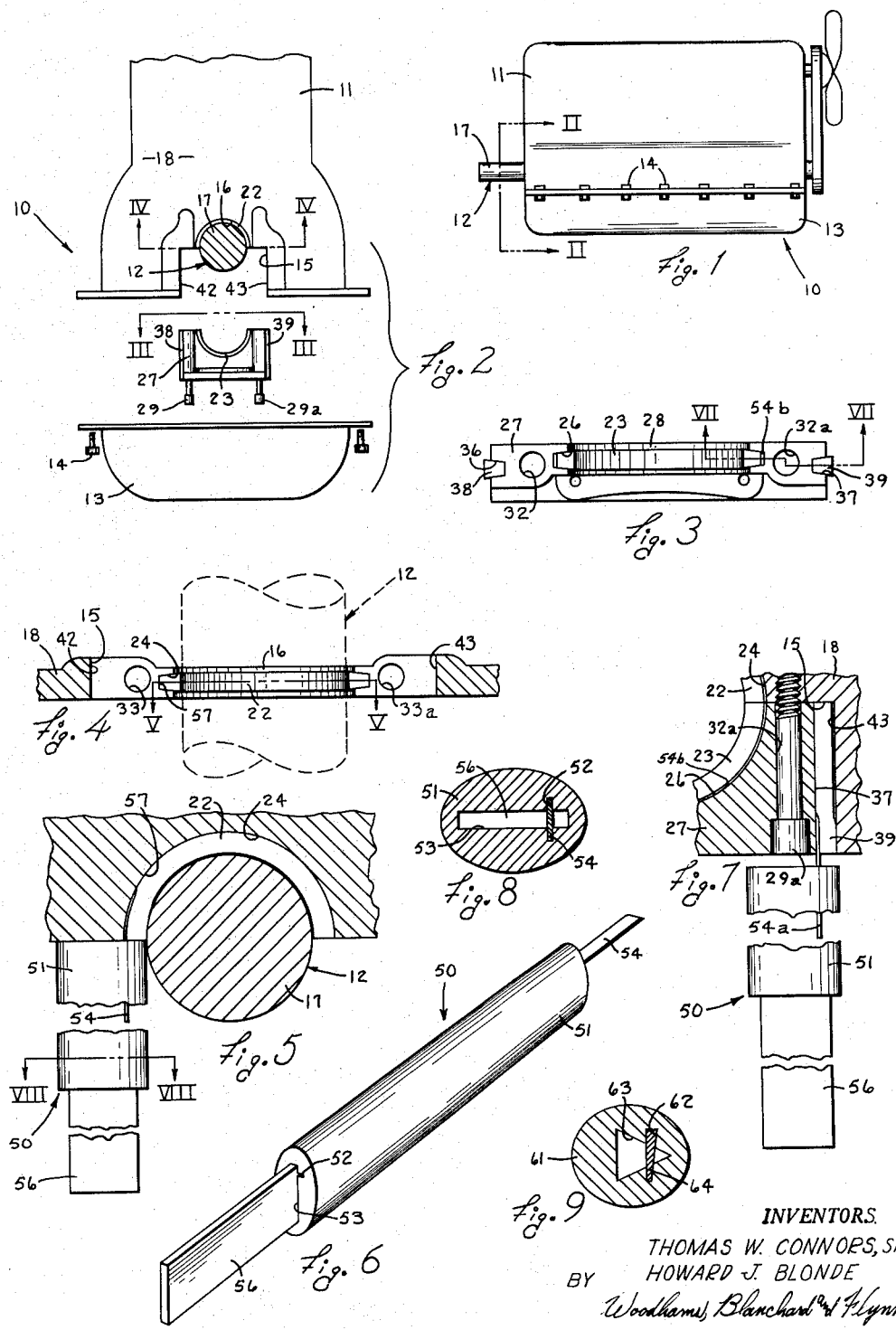

3,096,573
APPARATUS FOR REPAIRING A SEAL
Thomas W. Connors, Sr., Sturgis, and Howard J. Blonde, White Pigeon Township, St. Joseph County, Mich.; said Connors assignor to said Blonde
Filed Dec. 9, 1960, Ser. No. 74,986
5 Claims. (Cl. 29—238)

This invention relates in general to an apparatus for repairing a seal and, more particularly, for reducing the spacing between an elongated sealing member and the surface with which said sealing member is intended to effect a sealing engagement without removing the sealing member from its position adjacent said surface and without damaging or distorting the sealing face on said sealing member.

Relatively compressible sealing members have long been used between two relatively hard surfaces which are relatively movable in the planes of said surfaces to prevent the leakage of fluids between said surfaces. By way of example, it has been common practice for many years to use arcuate, relatively compressible sealing members between the peripheral surface of a rotatable shaft and a journal box or other wall structure through which the shaft extends. More specifically, and also for example, a shaft seal of this type is presently used around the end portion of a crankshaft, which extends through the wall of the engine block, for the purpose of preventing the escape of lubricating oil from the crankcase along said shaft. Thus, reference will be made herein to the use and operation of the invention in connection with the repair of a crankshaft seal, because it was from the problem of repairing such a seal that this invention developed. However, it will be recognized that the invention can be adapted to many other uses and, therefore, specific reference herein to a particular use of the invention is intended to be for illustrative purposes only.

Much time, effort and expense have been devoted to the development of a simple, leak-proof seal for a crankshaft. Nevertheless, it is still common practice to place arcuate sealing members, which are fabricated from a fibrous material, around that portion of the crankshaft which extends through the engine block. During normal operation of the engine over a period of time, wear and vibration will eventually create a space between the periphery of the shaft and the adjacent portion of the shaft seal so that undesirable amounts of oil will move along the crankshaft past the seal and thereby leak out of the engine. This leakage sometimes results in damage to the engine, due to the loss of oil. Moreover, such leakage also increases the cost of operating the engine and creates a messy condition on the ground or floor where the engine is operated or, in the case of the automobile engine, where the vehicle is parked.

In many existing automotive engines, the crankshaft seal is comprised of two semicircular sealing members, one of which embraces the upper side of the crankshaft and the other of which embraces the lower side. In one common arrangement, the upper sealing member is disposed in an arcuate groove in the wall of the engine block and the lower sealing member is disposed in an arcuate groove in a seal retainer which is removably supported upon the engine block. If a leak develops in the bottom segment of the seal, the oil pan and a retainer for the lower segment are removed from the engine block. The lower sealing member is removed and replaced, after which the parts are reassembled, which is a relatively simple, hence inexpensive, operation. However, if the leak develops in the upper segment of the shaft seal, then the repair of the leak according to existing procedures is difficult and costly. More specifically, the repair of the upper sealing member necessitates the raising of the engine block and the removal of the crankshaft from the block.

Many unsuccessful efforts have been made in the past to devise a method for removing and replacing the upper sealing member while the crankshaft and the engine block are in their normal relative positions. However, it is extremely difficult, if not impossible, to insert or otherwise move a compressible sealing element along, and into position between, two rigid and closely spaced surfaces without destroying the effectiveness of the seal. During the insertion of the sealing member under these conditions, the sealing surface thereof becomes distorted, if not damaged, so that it may leak as bad as, and sometimes worse than, the seal which is being replaced. Thus, experienced mechanics recommend the separation of the two, arcuate surfaces so that the new seal can be properly positioned first with respect to the one of said surfaces which holds the seal and thereafter properly seated against the other surface. In view of the costliness of this work, engines are frequently permitted to operate long after the upper seal segment of the crankshaft seal has been found to be leaking badly, thereby creating the above-mentioned problems of engine damage and costly operation.

Accordingly, a primary object of this invention has been the provision of an apparatus whereby the spacing between an elongated sealing member and the sealing surface with which it is intended to be engaged can be reduced by inserting between the sealing member and the structure supporting same an elongated element of a uniform predetermined thickness, which causes said sealing member to be moved snugly against the sealing surface.

A further object of this invention has been the provision of an apparatus, as aforesaid, whereby an arcuate sealing member, such as the sealing members which encircle a crankshaft where it passes through an engine block, can be repaired after a leak occurs therein by inserting an elongated flat element of uniform thickness into the groove in the engine block in which the sealing member is disposed.

A further object of this invention has been the provision of an apparatus, as aforesaid, which is inexpensive to produce and which can be provided in a kit for use by any person capable of using the simple tools required to prepare the engine for the use of the invention.

A further object of this invention has been the provision of an apparatus, as aforesaid, which can be utilized for repairing many types of leaking seals in a wide variety of circumstances with less difficulty and expense than previously involved to effect such repair.

Other objects and purposes of this invention will become apparent to persons familiar with this type of equipment upon reading the following descriptive material and examining the accompanying drawings, in which:

FIGURE 1 is a side elevational view of an automotive engine to which the invention can be applied.

FIGURE 2 is an exploded sectional view substantially as taken along the line II—II in FIGURE 1.

FIGURE 3 is a sectional view taken along the line III—III in FIGURE 2.

FIGURE 4 is a sectional view taken along the line IV—IV in FIGURE 2.

FIGURE 5 is a sectional view taken along the line V—V in FIGURE 4.

FIGURE 6 is a perspective view of an apparatus for practicing the method of the invention.

FIGURE 7 is a broken sectional view taken along the line VII—VII in FIGURE 3.

FIGURE 8 is a sectional view taken along the line VIII—VIII in FIGURE 5.

FIGURE 9 is a sectional view similar to that shown in FIGURE 8 and disclosing an alternate structure.

For the purpose of convenience in description, the terms "upper," "lower," and terms of similar import will have reference to the structure with which the invention is utilized as appearing in FIGURES 1 and 2. The terms "inner," "outer" and derivatives thereof will have reference to the geometric center of the apparatus of the invention as appearing in FIGURE 6. The terms "front" and "rear," and derivatives thereof will have reference to the right and left ends, respectively, of the engine 10 and parts thereof as appearing in FIGURE 1.

General Description

The apparatus of the invention, one form of which is disclosed herein for the purpose of illustrating the invention, includes an elongated, rigid guide member having a pair of elongated openings extending lengthwise therethrough, said openings being in continuous communication with each other throughout the lengths thereof. An elongated repair element is slidably and snugly received into and through one of said openings, and an elongated driving member is slidably and snugly receivable into and through the other of said openings for engaging an end of the repair element and moving same through and out of the guide member.

By using the above-described device, the repair element can be caused to move between one side of an elongated sealing member and the adjacent surface of the structure supporting said sealing member whereby the opposite side of the sealing member is urged toward the surface with which the sealing member is intended to be in sealing engagement.

The automotive engine 10 (FIGURES 1 and 2), which has been selected to illustrate the use of a particular embodiment of the invention, includes a block 11, a crankshaft 12 in the block and an oil pan 13 secured to the block 11 by means of the bolts 14. The rear wall 18 of the engine block 11 has a recess 15 in its lower edge, the upper or inner wall of said recess including a semicircular portion 16. The rearward end 17 (FIGURE 2) of the crankshaft 12 extends through the recess 15 in the rear wall 18 where it is snugly embraced and encircled by two semicircular sealing members 22 and 23, which may be fabricated from a relatively compressible fibrous material of any conventional type.

The upper sealing member 22 (FIGURE 4) is disposed within an arcuate groove 24 in the semicircular portion 16 of the end wall 18 adjacent the end 17 of the shaft 12. The lower end of the recess 15 in the rear wall 18 of the block 11 is closed by a removable seal retainer 27, which has an arcuate, concave surface 28 at its upper end. The sealing member 23 is snugly received into an arcuate groove 26 in the surface 28 of the seal retainer 27. The seal retainer 27 is removably held within the recess 15, and substantially within the plane defined by the rear wall 18, by means of a pair of bolts 29 and 29a, which slidably extend through parallel, smooth bore openings 32 and 32a, respectively, in said seal retainer 27 for threaded reception into the threaded openings 33 and 33a, respectively, in the rear wall 18 (FIGURE 4).

The seal retainer 27 has a pair of grooves 36 and 37 (FIGURE 3) in the opposite ends thereof for reception of the sealing members 38 and 39 which are snugly engageable with the side walls 42 and 43 of the recess 15. The grooves 24, 26, 36 and 37 all have side walls which, in this embodiment diverge toward the open side of the groove. However, other arrangements of said side walls are contemplated.

The above-described structure of the engine 10, including the block 11, crankshaft 12, sealing members 22 and 23, and seal retainer 27 are substantially conventional and may be found, at least in substance, in many existing engines. The apparatus 50 of the invention (FIGURE 6) is comprised of an elongated substantially rigid guide member 51 which may be fabricated from metal, plastic or any other suitably rigid material. The guide member 51 has a pair of elongated guide openings 52 and 53 (FIGURE 8) which extend lengthwise through the guide member 51 and which, in this particular arrangement, intersect each other transversely of the guide member 51 to form a cross. In the particular embodiment disclosed in FIGURES 6 and 8, the guide opening 52 is shaped so that it slidably receives and snugly embraces an elongated, flat and relatively thin spacing element 54, which has a selected, uniform thickness. The guide opening 53 is shaped so that it slidably receives and snugly embraces a drive member 56 which is relatively rigid and noncompressible. One end of the spacing element 54, which is preferably fabricated from a non-compressible and flexible material such as metal or plastic, is engageable within the guide member 51 by an adjacent end of the drive member 56 for the purpose of urging said spacing element 54 through and out of one end of the guide member 51.

Where the spacing element 54 is to be used within a groove 24 beneath a sealing member 22, the spacing element 54 is preferably of substantially the same length and width as the bottom wall 57 of the groove 24. Moreover, the thickness of the spacing element 54 will be approximately equal to the amount of movement required by the sealing member 22 toward the crankshaft 12 to effect a proper sealing engagement with the end 17 thereof.

It will be recognized, as shown in FIGURE 9 with respect to the alternate guide member 61, that guide openings 62 and 63 may be of different sizes and shapes than those shown in FIGURE 8, if desired or required for a particular utilization. The guide opening 62, for example, has a wedge-shaped cross section for receiving a spacing element 64 which tapers from one lengthwise edge toward the other. Moreover, it will be recognized that, whereas the snug reception of the spacing element 54 into the guide opening 52 is desirable, the apparatus 50 can be used effectively where the spacing element 54 has a slightly smaller cross-sectional size than the guide opening 52 therefor.

Operation

Referring to the engine 10, which has been disclosed herein for illustrative purposes, a leaking shaft seal around the crankshaft 12 can be quickly and easily repaired by means of the applicants' invention in the following manner. After dropping the oil pan 13, and removing the seal retainer 27, as shown in FIGURE 2, a spacing element 54 of the proper size is inserted into the guide opening 52 within the guide member 51. The end of the guide member 51, through which the spacing element 54 projects, is placed adjacent to one circumferential end of the groove 24 so that the portion of the spacing element 54 extending from the guide member 51 can be inserted into the groove 24 between said bottom wall 57 thereof and the adjacent side of the sealing member 22. The lower end of the drive member 56, which projects downwardly from the guide member 51 is urged upwardly, whereby the spacing element 54 is urged out of the guide member 51 and along the bottom wall 57 of the groove 24.

Because the spacing element 54 is flexible, it follows along the bottom wall 57 and thereby urges the sealing member 22 outwardly from said bottom wall 57 toward, and into snug engagement with, the crankshaft 12. This operation, which is terminated when the spacing element 54 is completely discharged from the guide opening 52, can be accomplished in a few seconds. Moreover, the sealing member 22 is moved back into sealing engagement with the shaft 12, whereby the seal is repaired, without distorting, damaging or disturbing the surface of the sealing member adjacent the crankshaft 12. Thus, the original sealing qualities of said sealing member 22 are preserved and the seal is as efficient as when originally installed.

As the spacing element 54 is advanced along the arcuate groove 24, the leading end thereof will at all times tend to move toward the rigid bottom wall 57 of the groove, instead of into the relatively soft, compressible sealing member 22.

The apparatus 50 (FIGURE 7), including the guide member 51, spacing element 54 and drive member 56, can be utilized to urge a substantially straight sealing member 39 into snug engagement with the adjacent side wall 43 where leakage has developed therebetween. In such case, it may be desirable to bevel slightly the leading end of the spacing element 54a away from the adjacent sealing member 39 so that the leading end of the element 54a does not gouge into the sealing member 39. Alternately, the spacing element 54a may be arched slightly so that its concave surface faces the bottom of the groove 37 during insertion to avoid damage to the sealing member 39.

Ordinarily, the spacing element 54a will be inserted between the sealing member 39 and the bottom wall of groove 37 after, rather than before, the seal retainer 27 is returned to its position within the recess 15, thereby simplifying such return.

The sealing member 23 can be removed from the groove 26 and replaced by a new sealing member or, where desirable, a spacing element 54b (FIGURE 7) can be inserted into the groove 26 beneath the sealing member 23 in substantially the same manner set forth above with respect to the sealing member 22. Thereafter, the seal retainer 27 is bolted into position within the recess 15 and the oil pan 13 is connected to the block 11. Thus, the repair of both sealing members can be accomplished without removing the engine block 11 from its mountings, without removing the crankshaft 12 from the block 11 and without distorting or otherwise disturbing the smooth, sealing surface on the sealing members 22, 23, 38 and 39, which are engageable with the crankshaft 12 and the side walls 42 and 43, respectively.

It follows from the above disclosure that applicants' apparatus can be advantageously used to improve the sealing qualities of this type of sealing member in new installations. More specifically, a new seal can be placed into position while loosely engaging the two opposing surfaces. Thereafter, the seal can be moved into snug, sealing position against one surface by inserting a proper spacing element between the sealing member and the other surface.

Although particular preferred embodiments of the invention have been described in detail above for the purposes of disclosing the method and apparatus of the invention, it will be understood that variations or modifications of such disclosure, which lie within the scope of the appended claims, are fully contemplated.

What is claimed is:
1. An apparatus for decreasing the tolerance between an elongated, relatively compressible sealing means and an adjacent surface, said sealing means being disposed within, and having one side projecting substantially throughout its length from, a channel-shaped groove, the combination comprising:
    an elongated, thin and relatively incompressible and nonextensible element of substantially uniform thickness throughout its length, said element being of no greater width and length than the width and length of the sealing means;
    an elongated guide member having a first lengthwise opening therethrough, said first opening being of cross-sectional size and shape similar to and no greater than the cross-sectional size and shape of said elongated element, said guide member being adapted for slidably and snugly receiving into the said first opening, said elongated, thin and relatively incompressible element, and said first opening being adapted to guide movement of said element;
    a second lengthwise opening through said elongated guide member, said second opening communicating with the first opening throughout the length thereof; and
    a substantially rigid, elongated driving member snugly and slidably receivable into said second opening, part of said driving member extending into a portion of said first opening for engagement with one end of said element for urging said element through said first opening and endwise into the groove between the bottom thereof and the adjacent side of said sealing means, whereby said sealing means is urged sidewardly out of said groove and toward said surface.

2. An apparatus for increasing the sideward projection of a relatively compressible sealing means from a channel-shaped groove in a concave surface, the combination comprising:
    an elongated and substantially rigid guide member having a lengthwise opening extending therethrough, said opening having a cross section of uniform size and shape substantially throughout its length;
    a substantially rigid and elongated driving member snugly and slidably receivable into said opening, said driving member being substantially as long as said guide member; and
    an elongated, thin and relatively incompressible and non-extensible element of substantially uniform thickness throughout its length, said element being of no greater width and length than the width and length of said sealing means, said element being slidably receivable into and along said opening in said guide member for engagement by one end of said driving member, whereby said element can be urged into said groove between said sealing means and the bottom wall of said groove.

3. The structure of claim 2 wherein both said element and said driving member are of smaller cross-sectional area than said opening; and
    wherein part of said one end of said driving member is engageable with part of the adjacent end of said element within said opening.

4. An apparatus for increasing sideward projection of a relatively compressible sealing means from a channel shaped groove in a surface, the combination comprising:
    an elongated and substantially rigid guide member having a first lengthwise opening extending therethrough, most of said first opening having a cross section of substantially uniform size and shape;
    a substantially rigid and elongated driving member snugly and slidably receivable into said first opening, said driving member being at least substantially as long as the guide member;
    means defining a second lengthwise opening through said guide member, most of said second opening having cross section of substantially uniform size and shape, said second opening communicating with said first opening throughout the length thereof; and
    an elongated, thin and relatively incompressible and nonextensible element of substantially uniform thickness throughout its length, said element being of no greater width and length than the width and length of said sealing means, said element being slidably receivable into and along said second opening and part of said first opening in said guide member for engagement by one end of said driving member, whereby said element can be urged into said groove between the bottom wall thereof and said sealing means.

5. An apparatus for increasing the sideward projection of a relatively compressible sealing means from a channel-shaped groove in a concave surface, the combination comprising:
    an elongated and substantially rigid guide member having a lengthwise opening extending therethrough, most of said opening having a cross section of substantially uniform size and shape;

a substantially rigid and elongated driving member snugly and slidably receivable into said opening, said driving member being at least substantially as long as said guide member; and an elongated, thin and relatively incompressible and nonextensible element of substantially uniform thickness throughout its length, said element being of no greater width and length than the width and length of said sealing means, said element being slidably receivable into and along said opening in said guide member for engagement by one end of said driving member, whereby said element can be urged into said groove between said sealing means and the bottom wall of said groove.

References Cited in the file of this patent
UNITED STATES PATENTS

| | | |
|---|---|---|
| 1,984,748 | Knutson | Dec. 18, 1934 |
| 2,252,816 | Santrey | Aug. 19, 1941 |
| 2,875,513 | Dulin | Mar. 3, 1959 |
| 2,884,824 | Sherman | May 5, 1959 |
| 2,917,819 | Britton et al. | Dec. 22, 1959 |